United States Patent
Bassov et al.

(10) Patent No.: US 10,037,341 B1
(45) Date of Patent: Jul. 31, 2018

(54) NESTING TREE QUOTAS WITHIN A FILESYSTEM

(71) Applicant: EMC Corporation, Hopkinton, MA (US)

(72) Inventors: Ivan Bassov, Brookline, MA (US); Jean-Pierre Bono, Westborough, MA (US); Weigang Zhong, Beijing (CN); Yingchao Zhou, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1102 days.

(21) Appl. No.: 14/230,930

(22) Filed: Mar. 31, 2014

(51) Int. Cl.
*G06F 17/30* (2006.01)
*G06F 12/00* (2006.01)
*G06F 21/62* (2013.01)

(52) U.S. Cl.
CPC .. *G06F 17/30221* (2013.01); *G06F 17/30082* (2013.01); *G06F 21/6218* (2013.01)

(58) Field of Classification Search
CPC ............... G06F 17/30194; G06F 17/30283
See application file for complete search history.

(56) References Cited

U.S. PATENT DOCUMENTS

| | | | |
|---|---|---|---|
| 7,743,038 B1 * | 6/2010 | Goldick | G06F 17/30082 707/694 |
| 7,849,112 B2 | 12/2010 | Mane et al. | |
| 7,962,532 B1 * | 6/2011 | Pogde | G06F 17/30082 707/822 |
| 8,131,784 B1 * | 3/2012 | Zhuge | G06F 17/30194 707/823 |
| 8,515,904 B1 | 8/2013 | Dwyer, III et al. | |
| 8,566,371 B1 | 10/2013 | Bono et al. | |
| 8,924,364 B1 | 12/2014 | Zhong et al. | |
| 2003/0009484 A1 * | 1/2003 | Hamanaka | G06F 17/30067 |
| 2004/0267827 A1 * | 12/2004 | Chang | G06F 17/30067 |
| 2005/0010666 A1 * | 1/2005 | Nanda | H04L 29/12141 709/225 |
| 2005/0050107 A1 * | 3/2005 | Mane | G06F 17/30067 |
| 2005/0066134 A1 * | 3/2005 | Tormasov | G06F 17/30067 711/151 |
| 2006/0117070 A1 * | 6/2006 | Thind | G06F 17/30067 |
| 2009/0083511 A1 * | 3/2009 | Kanda | G06F 3/0604 711/173 |
| 2013/0086121 A1 | 4/2013 | Preslan | |
| 2014/0081979 A1 * | 3/2014 | Pn | G06F 17/30138 707/741 |

* cited by examiner

*Primary Examiner* — David T Brooks
(74) *Attorney, Agent, or Firm* — BainwoodHuang

(57) ABSTRACT

Techniques are described for building, managing, and enforcing nested quota trees in a filesystem of a data storage system using internal filesystem structures. Such integrated, server-based, nested quota trees avoid the management overhead, communication delays, and slowed processing of proxy-based solutions and are thus more efficient and optimal.

20 Claims, 9 Drawing Sheets

| 80 qTree ID | 62 DB 82 Filehandle | 84 Parent qTree ID |
|---|---|---|
| 'a' | 82(a) Filehandle for directory 50(c) | NULL |
| 'b' | 82(b) Filehandle for directory 50(d) | 'a' |
| ⋮ | ⋮ | ⋮ |
| 'n' | 82(n) Filehandle | 'm' |

Fig. 3

| 80<br>qTree ID | 162<br>DB<br>82<br>Filehandle | 84<br>Parent qTree ID |
|---|---|---|
| 'a' | 182(a)<br>Filehandle for directory 150(c) | NULL |
| 'b' | 182(b)<br>Filehandle for directory 150(f) | 'a' → 'e' |
| 'c' | 182(c)<br>Filehandle for directory 150(e) | 'a' |
| 'd' | 182(d)<br>Filehandle for directory 150(b) | NULL |
| 'e' | 182(e)<br>Filehandle for directory 150(d) | 'a' |

Fig. 5

| 188(1) Size | 156(1) Inode for Directory 150(a) | |
|---|---|---|
| 188(2) Size | 156(2) Inode for file 152(a) | |
| 188(3) Size | 156(3) Inode for Directory 150(b) | 158(d) |
| 188(4) Size | 156(4) Inode for file 152(b) | 158(d) |
| 188(5) Size | 156(5) Inode for Directory 150(c) | 158(a) |
| 188(6) Size | 156(6) Inode for Directory 150(d) | 158(a)<br>↓<br>158(e) |
| 188(7) Size | 156(7) Inode for Directory 150(e) | 158(c) |

| 188(8) Size | 156(8) Inode for file 152(c) | 158(c) |
|---|---|---|
| 188(9) Size | 156(9) Inode for Directory 150(f) | 158(b) |
| 188(10) Size | 156(10) Inode for file 152(d) | 158(a)<br>↓<br>158(e) |
| 188(11) Size | 156(11) Inode for Directory 150(g) | 158(b) |
| 188(12) Size | 156(12) Inode for file 152(e) | 158(b) |
| 188(13) Size | 156(13) Inode for file 152(f) | 158(b) |
| 188(14) Size | 156(14) Inode for file 152(g) | 158(b) |

NESTING TREE QUOTAS WITHIN A FILESYSTEM

BACKGROUND

Many enterprises and other entities provide data storage capacity to users (e.g., employees or clients) and/or applications via data storage arrays connected to a network. Often, an enterprise may wish to impose limits on how much storage individual users can consume in particular directories, e.g., for storing files and data. An enterprise may also wish to impose limits on how much space an application may consume, such as by limiting the amount of space available in the application's directory.

Some conventional data storage systems accommodate these needs by employing quota trees. Quota trees are storage limits that can be applied to particular directories on a per-directory basis. For example, by imposing a quota tree on every user directory on a data storage array, the enterprise is able to limit the amount of storage each user is allowed to consume. Similarly, by imposing a quota tree on every application directory, the enterprise is able to limit how much space any given application can consume for its own use.

SUMMARY

Unfortunately, conventional quota trees are not sufficient in all situations. For example, although an enterprise may apply a quota tree to a directory, the enterprise is generally not also able to apply separate quota trees to sub-directories of the directory. Thus, for example, quota trees cannot be assigned both to a high-level directory for a group of users and to sub-directories of the high-level directory for individual users.

It may be possible to use a proxy server between users and the data storage array to enforce nested quota trees via third party software, but this approach is suboptimal because the third party software involves additional management, processing, and communication delays and slows the processing of time-critical user requests for data.

In order to alleviate these deficiencies, it would be desirable to impose nested quota trees (i.e., quota trees nested below other quota trees in a directory hierarchy) in an integrated manner within a filesystem on a data storage system. Thus, in contrast with the above-described approaches, improved techniques are described for building, managing, and enforcing nested quota trees in a filesystem of a data storage system using internal filesystem structures. Such integrated, server-based, nested quota trees avoid the management overhead, communication delays, and slowed processing of proxy-based solutions and are thus more efficient and optimal.

One embodiment of the improved techniques is directed to a method of managing storage in a filesystem having a directory hierarchy. The method includes (a) receiving, by a computing device, a first instruction to place a first quota tree within the directory hierarchy of the filesystem, (b) receiving, by the computing device, a second instruction to place a second quota tree within the directory hierarchy of the filesystem, (c) assigning, by the computing device, a first quota tree to a first directory of the filesystem, the first quota tree defining a first storage limit for storing files within the first directory, wherein assigning the first quota tree to the first directory includes placing an identifier of the first quota tree in an inode of each of a set of files of the first directory, and (d) assigning, by the computing device, a second quota tree to a second directory of the filesystem, one of the first directory and the second directory being subordinate to the other in the directory hierarchy, the second quota tree defining a second storage limit for storing files within the second directory, wherein assigning the second quota tree to the second directory includes placing an identifier of the second quota tree in an inode of each of a set of files of the second directory. Other embodiments are directed to a system, a computerized apparatus, and a computer program product for performing methods similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 depicts another example data structure used in connection with various embodiments.

FIG. 5 depicts another example data structure used in connection with various embodiments.

FIG. 7 depicts another example data structure used in connection with various embodiments.

DETAILED DESCRIPTION

Embodiments are directed to improved techniques for building, managing, and enforcing nested quota trees in a filesystem of a data storage system using internal filesystem structures. Such integrated, server-based, nested quota trees avoid the management overhead, communication delays, and slowed processing of proxy-based solutions and are thus more efficient and optimal.

Figure 1:
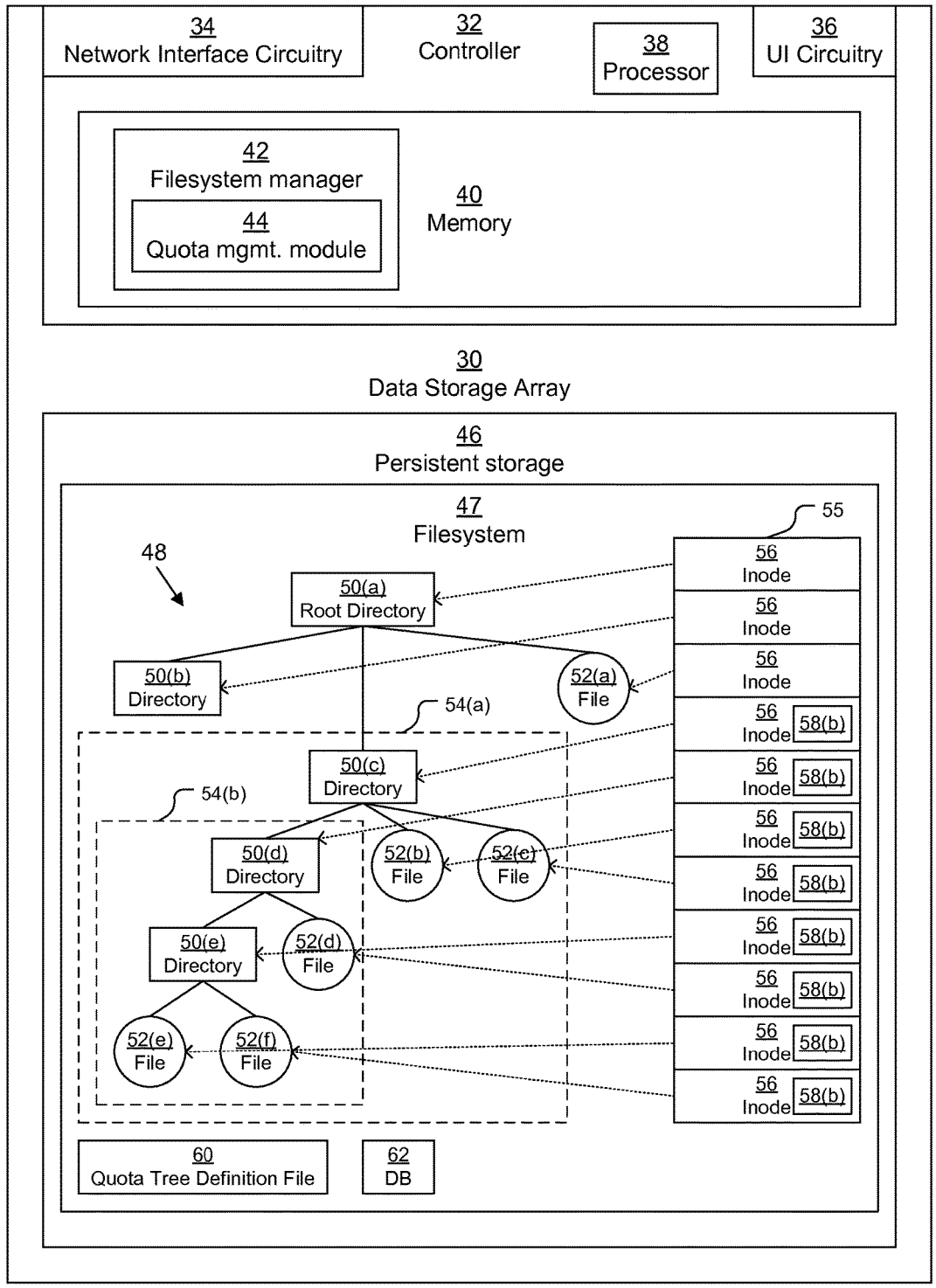
FIG. 1 depicts an example apparatus according to various embodiments.

FIG. 1 depicts an example data storage array 30. Data storage array 30 may be, for example, a VNX®, VNXe®, or CLARiiON® CX4 data storage array provided by the EMC Corporation of Hopkinton, Mass. Other data storage arrays may be used as well. Although described as a data storage array, in fact, any computing device capable of providing a filesystem may instead be utilized.

Data storage array 30 includes a controller 32 and persistent storage 46. In some embodiments, controller may be a storage processor board. Controller 32 may include network interface circuitry 34 for interfacing with a network, such as, for example, a local area network (LAN), a wide area network (WAN), the Internet, an intranet, a storage area network (SAN), a wireless network, a cellular data network, a fabric of connections and switches, etc., allowing a user to access the data storage array over the network. Network interface circuitry 34 may include one or more Ethernet cards, cellular modems, Wireless Fidelity (WiFi) wireless networking adapters, any other devices for connecting to a network, or some combination thereof. Controller 32 may also include user interface (UI) circuitry 36 to connect to one or more UI devices (e.g., a keyboard, mouse, display monitor, etc.) to access the data storage array locally.

Controller 32 also includes a processor 38 and memory 40. Processor 38 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 40 may be any kind of digital system memory, such as, for example, random access memory (RAM). Memory 40 stores an operating system (OS) (not depicted, e.g., Linux, UNIX, Windows, or a similar operating system) and one or more applications executing on processor 38 as well as data used by those programs (not depicted). Memory 40 stores a filesystem manager 42 during execution. Filesystem manager 42 may be a standalone application or it may be a component of the OS. Filesystem manager 42 includes a quota management module 44. It should be understood that the term "module" may refer to any component of a software application or system, typically a component arranged to perform a particular function or set of functions.

Filesystem manager 42 and quota management module 44 execute on processor 38 and interact with a user on a remote client machine via network interface circuitry 34 as well as persistent storage 46.

Persistent storage 46 may be any kind of persistent storage (e.g., solid-state storage and/or disk-based storage) for storing programs (e.g., OS, filesystem manager 42, and quota management module 44) and data even while the data storage array 30 is powered off. The OS (including its various components modules) and the applications are typically stored both in memory 40 and in persistent storage 46 so that they may be loaded into system memory 40 from persistent storage 46 upon a system restart. An application or OS component module (e.g., 42, 44), when stored in non-transient form either in system memory 40 or in persistent storage 46, forms a computer program product. The processor 38 running one or more of these applications or OS component modules thus forms a specialized circuit constructed and arranged to carry out the various processes described herein.

Persistent storage 46 stores at least one filesystem 47. Filesystem 47 provides a logical view (e.g., using a well-known file system protocol such as, for example, CIFS, NTFS, ext3, ext4, HFS, the UNIX File System (UFS), other protocols, or variants thereof) of a subset of persistent storage 46 (e.g., a volume or logical disk) to applications, allowing for humans to more easily interact with the persistent storage 46 using file-based operations. In one embodiment, a 64-bit version of UFS is used. Filesystem 47 encodes a directory hierarchy 48. Directory hierarchy 48 includes a set of directories 50 and files 52. It should be understood, that, generally speaking, a directory 50 is specialized type of file 52, and thus, a generic reference to "files" may include both files 52 and directories 50. As depicted, directory hierarchy 48 includes a root directory 50($a$) at an upper-most logical position. All files 50, 52 within directory hierarchy 48 are subordinate to the root directory 50($a$). Directories 50($b$), 50($c$) and file 52($a$) are direct members of root directory 50($a$) as is well-understood in the art. Additional sub-directories 50($d$), 50($e$) and files 52($b$)-($f$) are subordinate to directory 50($c$) as depicted in a hierarchical relationship. Each file 50, 52 is represented by metadata including an inode 56. Each inode 56 encodes metadata about its respective file 50, 52, including position data for data blocks of the file 50, 52 (and, in the case of large files, other metadata blocks, such as indirect blocks). The inodes 56 are typically stored in an inode table 55, allowing the various inodes 56 to be easily accessed and referenced using a fixed inode size offset (e.g., 128 bytes, 256 bytes).

Quota trees 54 (depicted as quota trees 54($a$), 54($b$)) create subsets of the directory hierarchy 48, specifically branches of the directory hierarchy 48, which have various kinds of quotas imposed thereon. As depicted, the branch of the directory hierarchy 48 with directory 50($c$) at its upper-most position is shown to use quota tree 54($a$). A sub-branch of that branch, headed by sub-directory 50($d$) is shown to use quota tree 54($b$). Thus, quota tree 54($b$) is nested below quota tree 54($a$). Thus, for example, quota tree 54($a$) may provide a storage quota of 390.6 megabytes (MB), while subordinate quota tree 54($b$) may provide a storage quota of 234.4 MB. In that example, the combined size of directories 50($d$), 50($e$), and files 52($d$)-($f$) may not exceed 234.4 MB, while the combined size of directories 50($c$)-50($e$), and files 52($b$)-($f$) may not exceed 390.6 MB.

Each inode 56 may contain an innermost quota tree identifier field 58. This field 58 identifies which quota tree 54 any given file 50, 52 is most directly located within. Thus, the inodes 56 for directories 50($d$), 50($e$), and files 52($d$)-($f$), respectively, each contain an innermost quota tree identifier field 58 with value 58($b$), pointing to quota tree 54($b$). Even though each of directories 50($d$), 50($e$), and files 52($d$)-($f$) is also part of quota tree 54($a$), since quota tree 54($b$) is subordinate to quota tree 54($a$), the innermost quota tree identifier field 58 for those directories 50($d$), 50($e$) and files 52($d$)-($f$) has value 58($b$) rather than 58($a$). However, since directory 50($c$) and files 52($a$), 52($b$) are only located within quota tree 54($a$), the inodes 56 for directory 50($c$) and files 52($a$), 52($b$), respectively, each contain an innermost quota tree identifier field 58 with value 58($a$), pointing to quota tree 54($a$). Because directories 50($a$), 50($b$) and file 52($a$) are not located within any quota tree 54, the inodes 56 for directories 50($a$), 50($b$) and file 52($a$) do not contain any non-null values within their respective quota tree identifier fields 58.

Filesystem 47, in addition to including inode table 55 and data blocks of files 50, 52, also includes a quota tree definition file 60 and a database (DB) 62.

Figure 2:
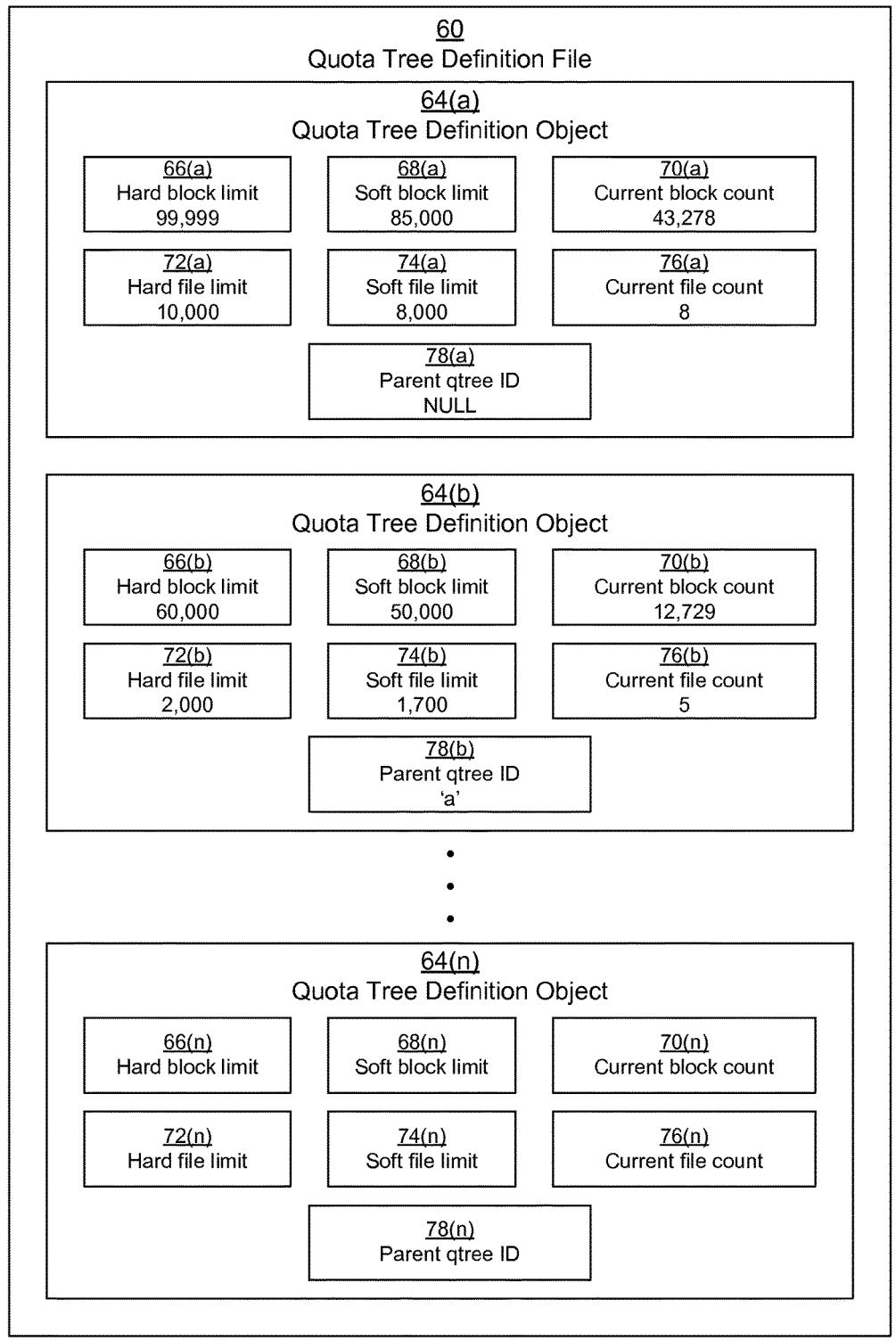
FIG. 2 depicts an example data structure used in connection with various embodiments.

FIG. 2 depicts an example quota tree definition file 60 in detail. It should be understood that, although described as a file, quota tree definition file 60 may be replaced with some other kind of quota tree definition registry having a non-file-based structure.

Quota tree definition file 60 includes a set of quota tree definition objects 64 (depicted as quota tree definition objects 64($a$), 64($b$), . . . , 64($n$)), each quota tree definition object 64 representing a particular quota tree 54. In some embodiments, quota tree definition file 60 is a sparse file, existing outside the directory hierarchy 48, without a fixed size. Quota management module 44 is able to directly access any particular quota tree definition object 64($x$) given a quota tree identifier for a particular quota tree 54($x$) as if the quota tree definition file 60 were laid out as an array.

Because the set of quota tree identifiers for existing quota trees 54 may not be continuous, the quota tree definition objects 64 may not be contiguous within quota tree definition file 60.

Each quota tree definition object 64 includes various parameters defining the respective quota tree 54. As depicted, each quota tree definition object 64 includes a hard block limit 66, a soft block limit 68, a current block count 70, a hard file limit 72, a soft file limit 74, and a current file count 76.

The hard block limit 66 represents a maximum permissible size on disk of all files 50, 52 within the quota tree 54 counted by total number of data blocks (in some embodiments, indirect blocks are counted as well). The soft block limit 68 represents a preferred maximum permissible size on disk of all files 50, 52 within the quota tree 54 counted by total number of blocks. A "preferred maximum" is a maximum number above which a warning is generated. However, since the soft block limit 68 is only a preferred maximum number of blocks, it is possible for the total number of blocks to exceed the soft block limit 68 as long as the hard block limit 66 is not exceeded; however, if the soft block limit 68 is exceeded, quota management module 44 may issue a warning, so that a user or application may be made aware that the hard block limit 66 is being approached. The current block count 70 represents the current total number of blocks on disk of all files 50, 52 within the quota tree 54, which allows the quota management module 44 to keep track of compliance with the hard block limit 66 and the soft block limit 68.

The hard file limit 72 represents a maximum number of files 50, 52 permitted within the quota tree 54. This number is equivalent to the number of inodes 56 representing those files 50, 52. The soft file limit 74 represents a preferred maximum number of files 50, 52 permitted within the quota tree 54. However, since this is only a preferred maximum, it is possible for the total number of inodes 56 to exceed the soft file limit 74 as long as the hard file limit 72 is not exceeded; however, if the soft file limit 74 is exceeded, quota management module 44 may issue a warning, so that a user or application may be made aware that the hard file limit 72 is being approached. The current file count 76 represents the current total number of files 50, 52 (or inodes 56) within the quota tree 54, which allows the quota management module 44 to keep track of compliance with the hard file limit 72 and the soft file limit 74.

In some embodiments, instead of or in addition to block and file limits, a quota tree definition object may contain other kinds of limits, such as, for example, size limits representing a utilized byte limit of all files, excluding empty space within blocks of files 50, 52.

Each quota tree definition object 64 also contains a parent quota tree (qTree) identifier (ID) 78, which points to a parent qTree 54 to which the qTree 54 defined by that quota tree definition object 64 is subordinate.

As depicted, quota tree definition object 64(a), which represents qTree 54(a), includes a hard block limit 66(a) of 99,999 blocks and a soft block limit 68(a) of 85,000 blocks. Assuming a block size of 4 kilobytes (KB) or 4,096 bytes, the hard block limit 66(a) is equivalent to approximately 390.6 MB (assuming complete block utilization), and the soft block limit 68(a) is equivalent to approximately 332 MB (assuming complete block utilization). As depicted, the qTree 54(a) is currently using the current block count 70(a) of 43,278 blocks, equivalent to about 169.1 MB (assuming complete block utilization). Quota tree definition object 64(a), which represents qTree 54(a), includes a hard file limit 72(a) of 10,000 files and a soft file limit 74(a) of 8,000 files. As depicted, the qTree 54(a) is currently using the current file count 70(a) of 8 files, which is well below both limits 72(a), 74(a). Since qTree 54(a) is not subordinate to any other qTree 54, the parent qTree ID 78(a) within quota tree definition object 64(a) is NULL.

As depicted, quota tree definition object 64(b), which represents qTree 54(b), includes a hard block limit 66(b) of 60,000 blocks and a soft block limit 68(b) of 50,000 blocks. Assuming a block size of 4 KB, the hard block limit 66(b) is equivalent to approximately 234.4 MB (assuming complete block utilization), and the soft block limit 68(b) is equivalent to approximately 195.3 MB (assuming complete block utilization). As depicted, the qTree 54(b) is currently using the current block count 70(b) of 12,729 blocks, equivalent to about 49.7 MB (assuming complete block utilization). Quota tree definition object 64(b), which represents quota tree 54(b), includes a hard file limit 72(b) of 2,000 files and a soft file limit 74(b) of 1,700 files. As depicted, the qTree 54(b) is currently using the current file count 70(b) of 5 files, which is well below both limits 72(b), 74(b). Since qTree 54(b) is directly subordinate to qTree 54(a), the parent qTree ID 78(b) within quota tree definition object 64(b) is 'a' pointing to qTree 54(a).

FIG. 3 depicts an example DB 62 in detail. DB 62 includes a set of columns, including an indexable qTree ID 80, a filehandle 82, and a parent qTree ID 84. DB also includes a set of rows for each qTree 54 in existence. Thus, the row representing qTree 54(a) includes a qTree ID 80 entry with value 'a,' a filehandle 82 entry having a filehandle 82(a) for directory 50(c) (which is at the head of qTree 54(a)), and a parent qTree ID 84 entry with a NULL value (because qTree 54(a) is not subordinate to any other qTree 54). As is well-known in the art, filehandle 82(a) may be a compound data structure including a filesystem identifier for filesystem 47, a generation number, and an offset within inode table 55 for the inode 56 representing directory 50(c) or a mathematical combination of those three values. Similarly, the row representing qTree 54(b) includes a qTree ID 80 entry with value 'b,' a filehandle 82 entry having a filehandle 82(b) for directory 50(d) (which is at the head of qTree 54(b)), and a parent qTree ID 84 entry with value 'a' (because qTree 54(b) is directly subordinate to qTree 54(a)).

Figure 4:
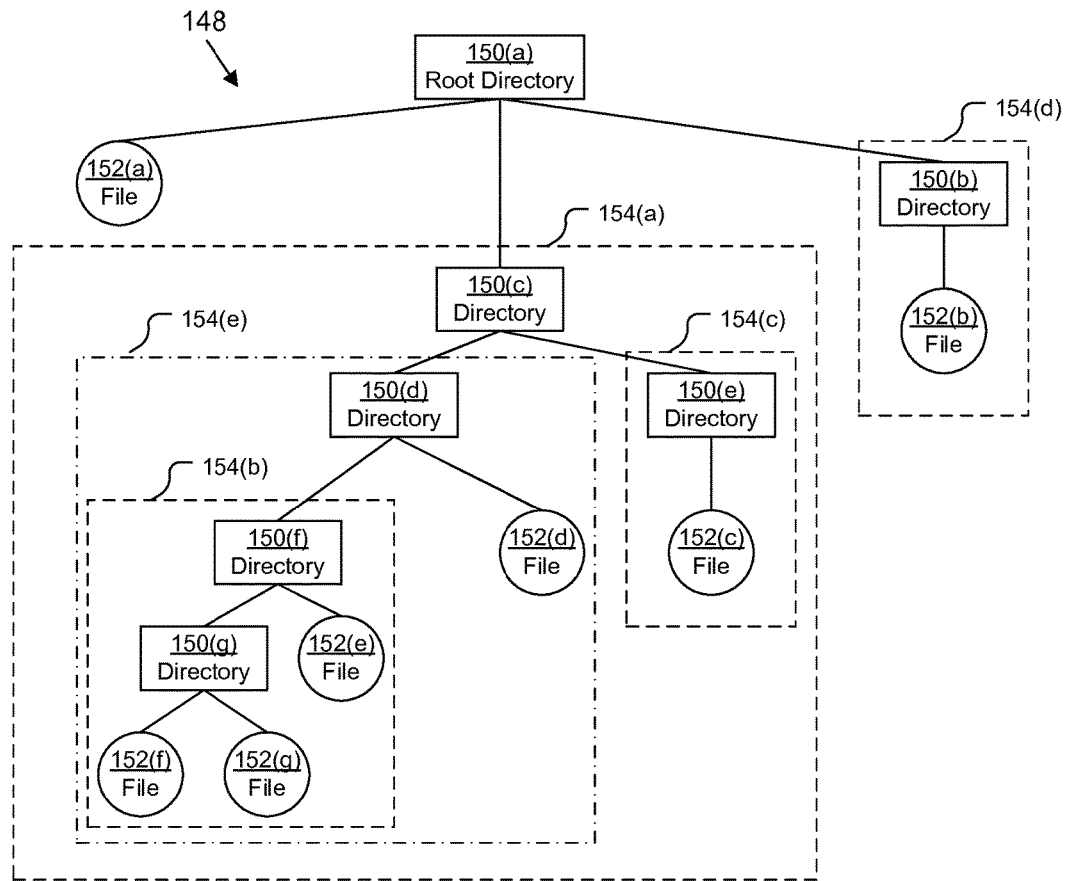
FIG. 4 depicts an example logical data arrangement used in connection with various embodiments.

FIGS. 4-7 represent a different example directory hierarchy 148 for a filesystem 47 with different contents. As depicted in FIG. 4, directory hierarchy 148 includes directories 150(a)-150(g) and filed 152(a)-152(g) for a total of 14 files 150, 152 in hierarchical arrangement with root directory 150(a) at the head. Initially, directory hierarchy 148 includes four qTrees 54. qTree 154(a) is headed by directory 150(c), qTree 154(b) is headed by directory 150(f), qTree 154(c) is headed by directory 150(e), and qTree 154(d) is headed by directory 150(b). FIG. 5 depicts an example DB 162 initially having four rows corresponding to the four qTrees 154(a)-154(d). Since qTrees 154(a) and 154(d) are subordinate to no other qTree 54, the rows for qTrees 154(a) and 154(d) within DB 162 include parent qTree ID 84 entries with NULL values. Since qTree 154(c) is directly subordinate to qTree 154(a), the row for qTree 154(c) within DB 162 includes parent qTree ID 84 entry with value 'a,' pointing to qTree 154(a). Since qTree 154(b) is initially directly subordinate to qTree 154(a), the row for qTree 154(b) within DB 162 initially includes parent qTree ID 84 entry with value 'a,' pointing to qTree 154(a).

Figure 6:
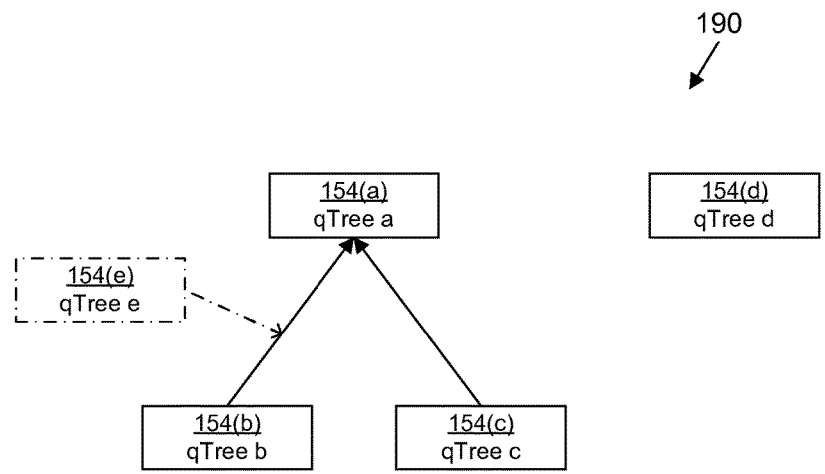
FIG. 6 depicts another example logical data arrangement used in connection with various embodiments.

FIG. 6 depicts an example qTree topology 190 for the qTrees 154 within directory hierarchy 148. The qTree topology 190 may be modeled by quota management module 44 by mapping the relationships between qTrees 154 as found in DB 162. Thus, qTree topology 190 indicates that qTrees 154(*b*) and 154(*c*) are initially directly subordinate to qTree 154(*a*), while qTree 154(*d*) is independent of the other qTrees 154.

FIG. 7 depicts an example inode table 155 having 14 inodes 156, representing the 14 files 150, 152 of directory hierarchy 148. Thus, for example, inode 156(1) represents root directory 150(*a*), and inode 156(*s*) represents file 152(*a*), neither of which contains an innermost qTree ID field 58, since neither is a member of any qTree 54. On the other hand, inode 156(*s*), which represents directory 150(*b*), has an innermost qTree ID field 58 with value 158(*d*), indicating that directory 150(*b*) is located within qTree 154(*d*). As another example, inode 156(8), which represents file 152(*c*), has an innermost qTree ID field 58 with value 158(*c*), indicating that file 152(*c*) is located within qTree 154(*c*) in an innermost way (even though file 152(*c*) is also within qTree 154(*a*), but not in an innermost way). As another example, inode 156(11), which represents directory 150(*g*), has an innermost qTree ID field 58 with value 158(*b*), indicating that directory 150(*g*) is located within qTree 154(*b*) in an innermost way (even though directory 150(*g*) is also within qTree 154(*a*), but not in an innermost way).

It should be understood that each inode 56, 156 includes storage usage information, such as a size field 188, indicating how much space (in bytes or blocks) its respective file 50, 52, 150, 152 takes up.

FIGS. 4-7 also depict the addition of a new qTree 154(*e*) (represented by a dash-dot pattern) added at a later point in time. Thus, in FIG. 4, new qTree 154(*e*) is headed by directory 150(*d*). As seen in FIG. 5, the DB 162, upon the addition of the new qTree 154(*e*) now has a new row indicating that the new qTree 154(*e*) has a parent qTree ID entry with value 'a,' pointing to qTree 154(*a*), because new qTree 154(*e*) is directly subordinate to qTree 154(*a*). Also, since qTree 154(*b*), which was previously directly subordinate to qTree 154(*a*), has now been placed within qTree 154(*e*), the row for qTree 154(*b*) within DB 162 a includes parent qTree ID 84 entry which has transitioned (as indicated by the arrow) from value 'a,' pointing to qTree 154(*a*), to value 'e,' instead pointing to new qTree 154(*e*).

As seen in FIG. 6, the qTree topology 190 is modified by the addition of new qTree 154(*e*). New qTree 154(*e*) now intervenes in the qTree topology 190 between qTree 154(*b*) and qTree 154(*a*).

As seen in FIG. 6, the inode table 155 is also modified by the addition of new qTree 154(*e*). Inode 156(6), which represents directory 150(*d*), previously had an innermost qTree ID field 58 with value 158(*a*), indicating that directory 150(*d*) was located within qTree 154(*a*) in an innermost way. However, now that new qTree 154(*e*) has been added headed by directory 150(*e*), inode 156(6) transitions (as indicated by the arrow) to instead have an innermost qTree ID field 58 with value 158(*e*), indicating that directory 150(*d*) is now located within qTree 154(*e*) in an innermost manner (even though directory 150(*g*) is also within qTree 154(*a*), but not in an innermost manner).

Similarly, inode 156(10), which represents file 152(*d*), previously had an innermost qTree ID field 58 with value 158(*a*), indicating that file 152(*d*) was located within qTree 154(*a*) in an innermost way. However, now that new qTree 154(*e*) has been added headed by directory 150(*e*) (to which file 152(*d*) is subordinate), inode 156(10) transitions (as indicated by the arrow) to instead have an innermost qTree ID field 58 with value 158(*e*), indicating that file 152(*d*) is now located within qTree 154(*e*) in an innermost manner (even though file 152(*d*) is also within qTree 154(*a*), but not in an innermost manner).

However, even though directory 150(*f*) is also now within new qTree 154(*e*), the inode 156(9) for directory 150(*f*) does not change upon the addition of new qTree 154(*e*) because directory 150(*f*) is most directly within qTree 154(*b*), so the innermost qTree ID field 58 for inode 156(9) remains with value 158(*b*).

Figure 8:
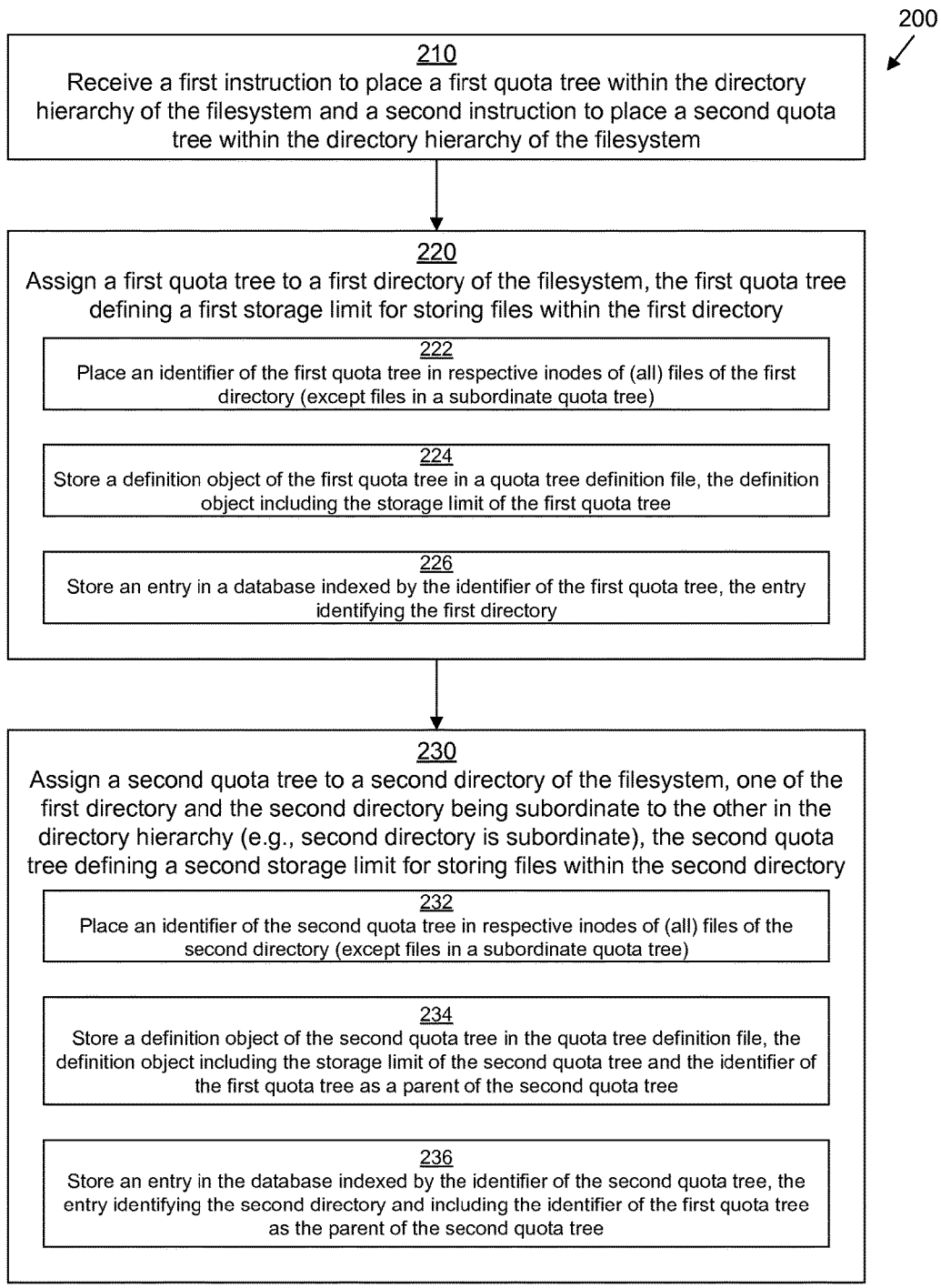
FIG. 8 depicts an example method according to various embodiments.

FIG. 8 depicts an example method 200 according to various embodiments for managing storage in a filesystem 47 having a directory hierarchy 48, 148 by building nested quota trees 54, 154 using internal filesystem structures (e.g., inode table 55, 155, quota tree definition file 60, and DB 62, 162). It should be understood that any time a piece of software, such as, for example, quota management module 44, is described as performing a method, process, step, act, or function, in actuality what is meant is that a computing device (e.g., data storage array 30) on which that application 44 is running performs the method, process, step, act, or function when executing that piece of software on its processor 38.

In step 210, quota management module 44 receives a first instruction to place a first quota tree (e.g., qTree 54(*a*)) within the directory hierarchy 48 of the filesystem 47 and a second instruction to place a second quota tree (e.g., qTree 54(*b*)) within the directory hierarchy 48 of the filesystem 47. The first instruction typically will include one or more storage limits (e.g., 66(*a*), 68(*a*), 72(*a*), and/or 74(*a*)) for the first qTree 54(*a*), and the second instruction typically will include one or more storage limits (e.g., 66(*b*), 68(*b*), 72(*b*), and/or 74(*b*)) for the second qTree 54(*b*).

It should be understood that these instructions may be received in either order. In addition, although, for the purposes of this example, the second qTree 54(*b*) is subordinate to the first qTree 54(*a*), in principle, the first quota tree could be subordinate to the second quota tree. Thus, steps 220 and 230 may be performed in parallel or in any order.

In step 220, quota management module 44 assigns the first qtree 54(*a*) having first storage limit(s) 66(*a*), 68(*a*), 72(*a*), and/or 74(*a*) to a first directory 50(*c*) of the filesystem as the head directory of that first qtree 54(*a*). In particular, quota management module 44 does this at least by performing subset 222, in which quota management module 44 places a qTree ID 58(*a*) for the first qTree 54(*a*) in an inode 56 of each of a set of files of first directory 50(*c*), including the inode 56 of the first directory 50(*c*) itself. Typically, if there is not yet any other subordinate qTree 54 below first qtree 54(*a*) (i.e., as long as the first qtree 54(*a*) is a lower-most qTree 54), then quota management module 44 places the qTree ID 58(*a*) for the first qTree 54(*a*) in the innermost qTree ID field 58 of the inode 56 of every file 50, 52 subordinate to the first directory 50(*c*) in addition to placing the qTree ID 58(*a*) for the first qTree 54(*a*) in the innermost qTree ID field 58 of the inode 56 of the first directory 50(*c*) itself. However, if another qTree 54 (e.g., second qTree 54(*b*)) already exists subordinate to the first directory 50(*c*), then files 50, 52 within that other qTree 54(*b*) would not have their inodes 56 modified.

Quota management module 44 also performs sub-step 224, in which quota management module 44 stores a first quota tree definition object 64(*a*) within quota tree definition file 60, typically indexed by the qTree ID 58(*a*) for the first qTree 54(*a*). This sub-step includes storing any received storage limits (e.g., 66(*a*), 68(*a*), 72(*a*), and/or 74(*a*)) within the first quota tree definition object 64(*a*). Quota management module 44 may also calculate and store a current block count 70(a) or current file count 76(a) within the first quota tree definition object 64(a) based on the size attribute 188 of the inodes 56, 156 of every file 50, 52 within the first qTree 54(a). However, in some embodiments, this step may be omitted at this point, provided that a quota check operation (see below in connection with FIG. 11) is triggered immediately after method 200 is performed. Quota management module 44 also stores an appropriate value in the parent qTree ID field 78(a), which in this example is NULL, because first qTree 54(a) is an uppermost qTree 54 (not being subordinate to any other qTree 54).

In some embodiments, quota management module 44 also performs sub-step 226, in which quota management module 44 stores a row in the DB 62 indexed by the qTree ID 58(a) (e.g., 'a') for the first qTree 54(a) with appropriate entries in the filehandle 82 and parent qTree ID 84 columns (see the first row in FIG. 3 for this example).

In step 230, quota management module 44 assigns the second qtree 54(b) having second storage limit(s) 66(b), 68(b), 72(b), and/or 74(b) to a second directory 50(d) of the filesystem as the head directory of that second qtree 54(b). In particular, quota management module 44 does this at least by performing subset 222, in which quota management module 44 places a qTree ID 58(b) for the second qTree 54(b) in an inode 56 of each of a set of files of second directory 50(d), including the inode 56 of the second directory 50(d) itself. Typically, if there is not yet any other subordinate qTree 54 below second qtree 54(b) (i.e., as long as the second qtree 54(b) is a lower-most qTree 54), then quota management module 44 places the qTree ID 58(b) for the second qTree 54(b) in the innermost qTree ID field 58 of the inode 56 of every file 50, 52 subordinate to the second directory 50(d) in addition to placing the qTree ID 58(b) for the second qTree 54(b) in the innermost qTree ID field 58 of the inode 56 of the second directory 50(d) itself. However, if another qTree 54 already exists subordinate to the second directory 50(d), then files 50, 52 within that other qTree 54 would not have their inodes 56 modified.

Quota management module 44 also performs sub-step 234, in which quota management module 44 stores a second quota tree definition object 64(b) within quota tree definition file 60, typically indexed by the qTree ID 58(b) for the second qTree 54(b). This sub-step includes storing any received storage limits (e.g., 66(b), 68(b), 72(b), and/or 74(b)) within the second quota tree definition object 64(b). Quota management module 44 may also calculate and store a current block count 70(b) or current file count 76(b) within the second quota tree definition object 64(b) based on the size attribute 188 of the inodes 56, 156 of every file 50, 52 within the second qTree 54(b). However, in some embodiments, this step may be omitted at this point, provided that a quota check operation (see below in connection with FIG. 11) is triggered immediately after method 200 is performed. Quota management module 44 also stores an appropriate value in the parent qTree ID field 78(b), which in this example is 'a,' because second qTree 54(b) is subordinate to first qTree 54(a).

In some embodiments, quota management module 44 also performs sub-step 236, in which quota management module 44 stores a row in the DB 62 indexed by the qTree ID 58(b) (e.g., 'b') for the second qTree 54(b) with appropriate entries in the filehandle 82 and parent qTree ID 84 columns (see the second row in FIG. 3 for this example).

Figure 9:
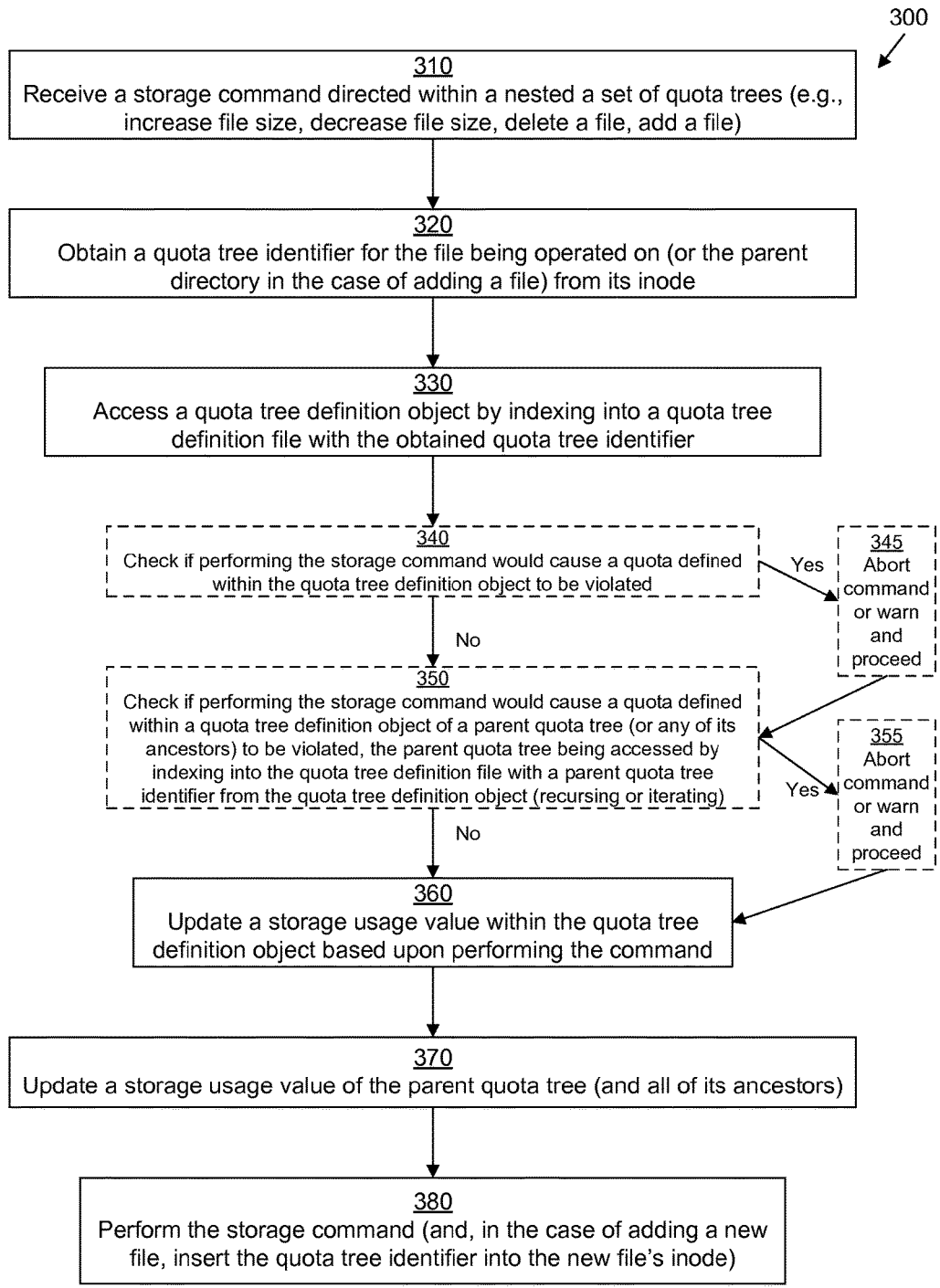
FIG. 9 depicts another example method according to various embodiments.

Once a set of nested quota trees 54 (e.g., 54(a), 54(b)) has been built, method 300, depicted in FIG. 9, may be performed to enforce the quota trees 54.

In step 310, filesystem manager 42 receives a storage management command directed within a nested a set of quota trees 54 (e.g., 54(a), 54(b)). This may be for example, a command to create a new file 50, 52, to delete a file 50, 52, or to modify a file 50, 52 in a way that would cause it to change its size (either by increasing or decreasing in size). Within this example, it will be assumed that the command is directed at directory 50(e), which is within qTree 54(b) (nested underneath qTree 54(a)).

In step 320, quota management module 44 obtains the qTree ID for the file being operated on. In the case of a delete or modify command (e.g., operating on file 52(f)), this step is accomplished by reading the value 58(b) stored within the innermost qTree ID field of the inode 56 for the file 52(f) being deleted or modified. In the case of a file creation operation, this step is accomplished by reading the value 58(b) stored within the innermost qTree ID field of the inode 56 for the directory 50(e) in which the new file is being created.

In step 330, quota management module 44 accesses the qTree definition object 64(b) by indexing into the qTree definition file 60 using the qTree ID (e.g., 'b') read as 58(b) in step 320.

In the case of a command whose operation would cause the target to increase in size (either a file create operation or a modify operation that adds extra data, net), optional steps 340-355 may be performed. Otherwise, operation proceeds to step 360.

In step 340, quota management module 44 checks whether performing the create or add operation would cause a local quota to be exceeded. Thus, quota management module 44 checks whether adding the number of new blocks necessitated by the operation to the current block count 70(b) would increase the current block count 70(b) above either the hard block limit 66(b) (in which case the command is aborted in step 345) or above only the soft block limit 68(b) (in which case a warning is issued in step 345, but operation may proceed to step 350). Similarly, quota management module 44 checks whether adding a new file necessitated by the operation to the current file count 76(b) would increase the current file count 76(b) above either the hard file limit 72(b) (in which case the command is aborted in step 345) or above only the soft file limit 74(b) (in which case a warning is issued in step 345, but operation may proceed to step 350).

In step 350, quota management module 44 checks whether performing the create or add operation would cause an ancestor quota to be exceeded. Thus, quota management module 44 checks whether adding the number of new blocks necessitated by the operation to the current block count 70(a) of the parent qTree definition object 64(a) (or of any of its respective parents—ancestors—either recursing or iterating) would increase the current block count 70(a) of the parent qTree definition object 64 (a) (or of any of its respective parents—ancestors—either recursing or iterating) above either the hard block limit 66(a) for that ancestor (in which case the command is aborted in step 355) or above only the soft block limit 68(a) for that ancestor (in which case a warning is issued in step 355, but operation may proceed to step 360). Similarly, quota management module 44 checks whether adding a new file necessitated by the operation to the current file count 76(a) (or of any of its respective parents—ancestors—either recursing or iterating) would increase the current file count 76(a) of the parent qTree definition object 64(a) (or of any of its respective parents—ancestors—either recursing or iterating) above either the hard file limit 72(a) for that ancestor (in which case the command is aborted in step 355) or above only the soft file limit 74(*a*) for that ancestor (in which case a warning is issued in step 355, but operation may proceed to step 360).

In step 360, quota management module 44 updates the storage usage value (e.g., current block count 70(*b*) or current file count 76(*b*)) to reflect the new storage usage after performing the command.

In step 370, quota management module 44 updates the storage usage value (e.g., current block count 70(*a*) or current file count 76(*a*)) of the parent qTree definition object 64(*a*) (or of any of its respective parents—ancestors—either recursing or iterating) to reflect the new storage usage after performing the command.

In step 380, which may be performed in parallel with step 370, the filesystem manager 42 performs the requested operation. In the case of a file create operation, quota management module 44 stores the read value 58(*b*) from within the innermost qTree ID field of the inode 56 for the directory 50(*e*) in which the new file is being created in the innermost qTree ID field 58 of the new file.

Figure 10:
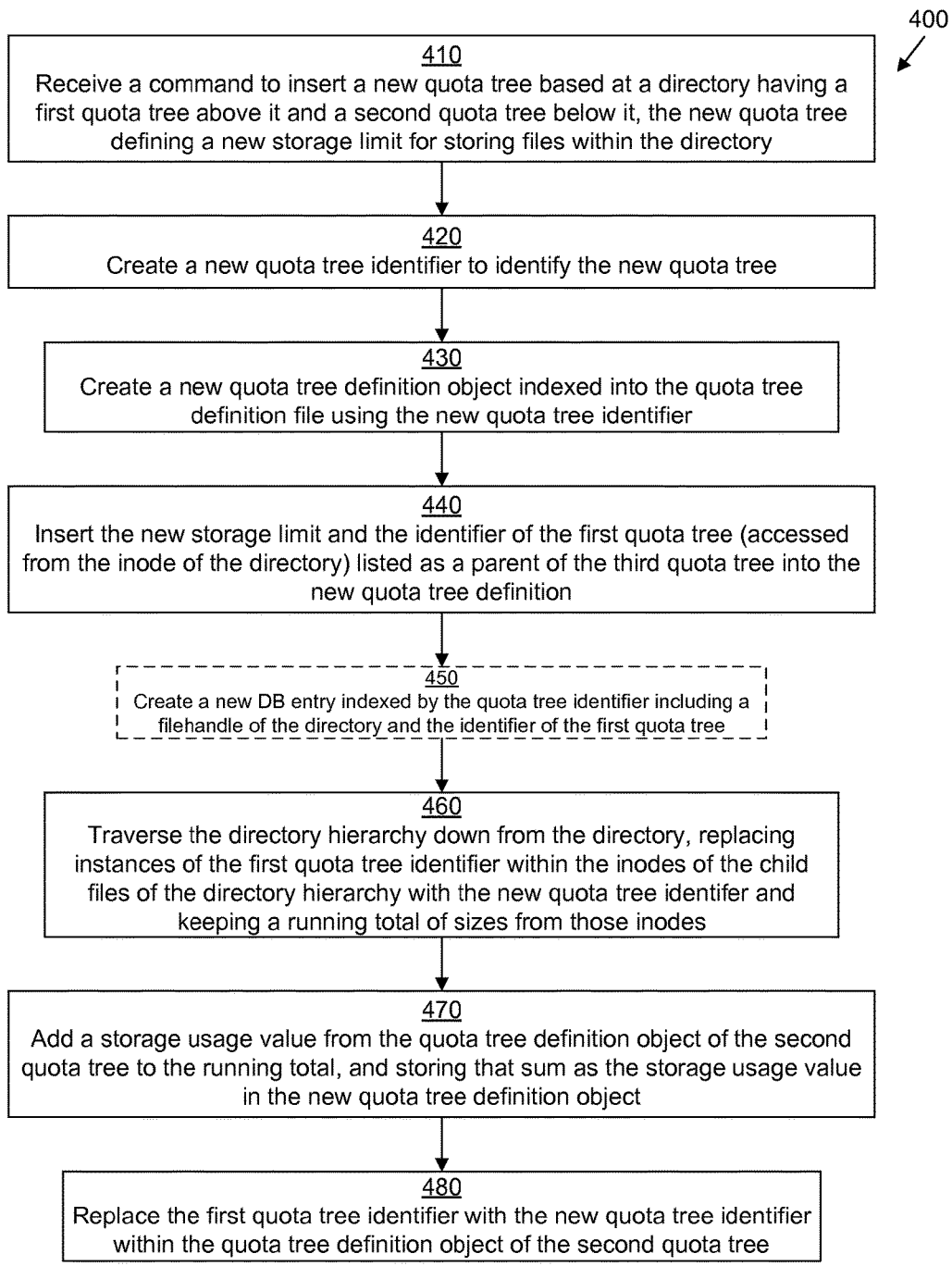
FIG. 10 depicts another example method according to various embodiments.

FIG. 10 depicts a method 400 performed by quota management module 44 for managing nested quota trees 154 in the event that a new quota tree (e.g., new qTree 154(*e*)) is inserted between two preexisting quota trees (e.g. qTrees 154(*a*) and 154(*b*)) as described previously in the context of FIGS. 4-7.

Figure 11:
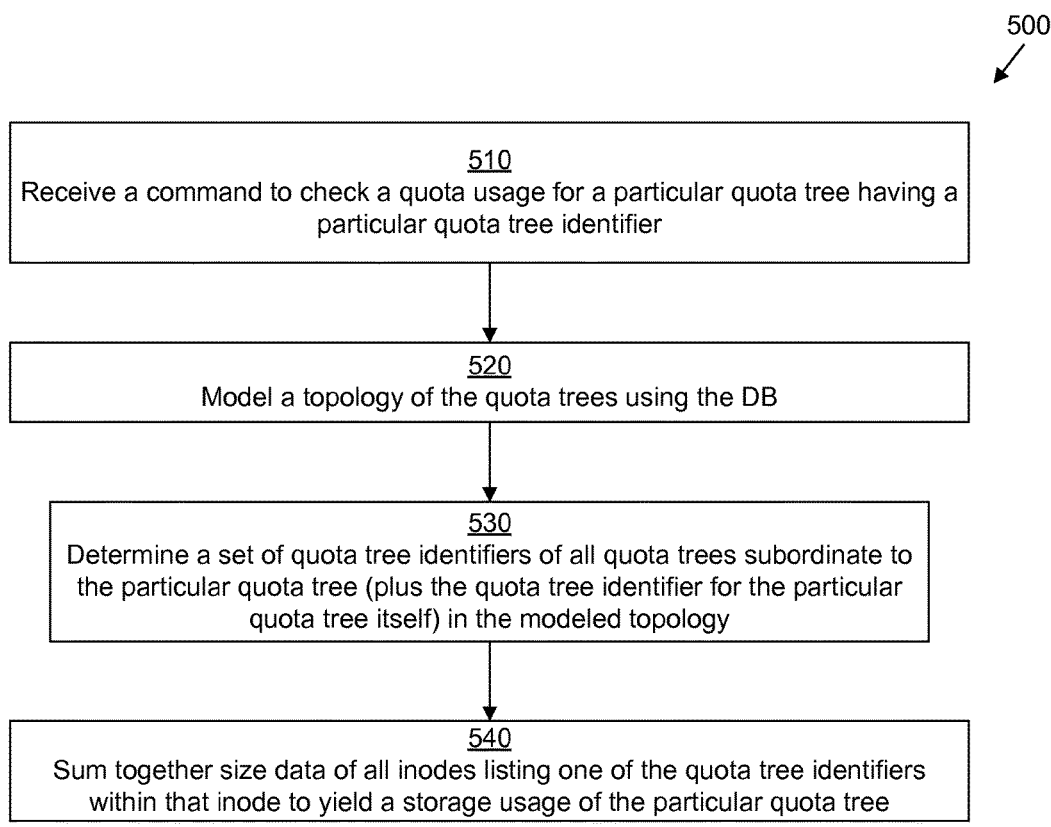
FIG. 11 depicts another example method according to various embodiments.

FIG. 11 depicts a method 500 for performing a quota check operation on a quota tree 54, 154.

In step 510, quota management module 44 receives a command to check a quota usage for a particular quota tree 54, 154 having a particular quota tree identifier. Thus, for example, say the command is a command to perform a quota check operation on qTree 154(*a*) in the context of FIG. 4 (assuming that new tree 154(*e*) has not yet been added). Thus, in the example, the command would identify the qTree 154(*a*) using qTree ID 'a.'

In step 520, quota management module 44 models the qTree topology 190 of the system by building the topology 190 using the child-parent relationships defined within DB 162.

In step 530, quota management module 44 determines the set of qTrees 154 that are subordinate to qTree 154(*a*), building a set of qTree IDs including qTree ID 'a' as well as the qTree IDs 'b,' 'c' of the subordinate qTrees 154(*b*), 154(*c*). Thus the set is {'a', 'b', 'c'} (or put another way, {158(*a*), 158(*b*), 158(*c*)}).

In step 540, quota management module 44 works through the inode table 155, looking for inodes 156 that include any of the qTree IDs from the set generated in step 530 in their respective innermost qTreeID fields 58, summing together the sizes 188 reported in those inodes 156. Since inodes 156(5)-156(14) include one of 158(*a*), 158(*b*), and 158(*c*) in their respective qTreeID fields 58, quota management module 44 sums together sizes 188(5)-188(14) to generate the quota usage for qTree 154(*a*). This may include generating a current block count 70, which may then be stored within a qTree definition object 64 for the qTree 154(*a*). If a current file count 76 is desired, then, quota management module 44 may simply count the number of inodes 156 that match qTreeID fields 58, yielding 14−5+1=10 files. This current file count 76 may then be stored within a qTree definition object 64 for the qTree 154(*a*).

Thus, techniques have been described for building, managing, and enforcing nested quota trees 54, 154 in a filesystem 47 of a data storage system 30 using internal filesystem structures (e.g., inode table 55, 155, qTree definition file 60, and/or DB 62, 162). Such integrated, server-based, nested quota trees avoid the management overhead, communication delays, and slowed processing of proxy-based solutions and are thus more efficient and optimal.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. § 102 or 35 U.S.C. § 103, such determination being a legal determination that depends upon many factors, not all of which are known to Applicants at this time.

What is claimed is:

1. A method of managing storage in a filesystem having a directory hierarchy, the method comprising:
   receiving, by a computing device, a first instruction to place a first quota tree within the directory hierarchy of the filesystem;
   receiving, by the computing device, a second instruction to place a second quota tree within the directory hierarchy of the filesystem;
   assigning, by the computing device, a first quota tree to a first directory of the filesystem, the first quota tree defining a first storage limit for storing files within the first directory, wherein assigning the first quota tree to the first directory includes placing an identifier of the first quota tree in an inode of each of a set of files of the first directory; and
   assigning, by the computing device, a second quota tree to a second directory of the filesystem, the second directory being subordinate to the first directory in the directory hierarchy, the second quota tree defining a second storage limit for storing files within the second directory, wherein assigning the second quota tree to the second directory includes placing an identifier of the second quota tree in an inode of each of a set of files of the second directory;
   wherein assigning the first quota tree to the first directory includes storing a definition object of the first quota tree in a quota tree definition registry, the definition object of the first quota tree including the first storage limit, wherein the quota tree definition registry is a sparse file without a fixed size; and
   wherein assigning the second quota tree to the second directory includes storing a definition object of the second quota tree in the quota tree definition registry, the definition object of the second quota tree including:
   the second storage limit; and
   the identifier of the first quota tree listed as a parent of the second quota tree.

2. The method of claim 1, wherein the second quota tree is a lower-most quota tree having no quota trees subordinate to it in the directory hierarchy, and
   wherein placing the identifier of the second quota tree in the inode of each of the set of files of the second directory includes placing the identifier of the second quota tree in the inode of every file subordinate to the second directory in the directory hierarchy.

3. The method of claim 1 wherein the method further comprises:
   receiving a storage command directed at a file subordinate to the second directory in the directory hierarchy, the file having an inode with an innermost quota tree identifier field storing the identifier of the second quota tree;
   accessing the definition object of the second quota tree in the quota tree definition registry by indexing into the quota tree definition registry using the identifier of the second quota tree from the inode of the file, the definition object of the second quota tree including a storage usage value reflecting a current storage usage of the second quota tree;
   accessing the definition object of the first quota tree in the quota tree definition registry by indexing into the quota tree definition registry using the identifier of the first quota tree listed as the parent of the second quota tree in the definition object of the second quota tree, the definition object of the first quota tree including a storage usage value reflecting a current storage usage of the first quota tree;
   updating the storage usage value within the definition object of the second quota tree to reflect a storage usage of the second quota tree upon performance of the storage command;
   updating the storage usage value within the definition object of the first quota tree to reflect a storage usage of the first quota tree upon performance of the storage command; and
   performing the storage command with respect to the file.

4. The method of claim 3,
   wherein executing the storage command on the computing device causes the size of the file to be reduced;
   wherein updating the storage usage value within the definition object of the second quota tree to reflect the storage usage of the second quota tree upon performance of the storage command includes reducing the storage usage value within the definition object of the second quota tree; and
   wherein updating the storage usage value within the definition object of the first quota tree to reflect the storage usage of the first quota tree upon performance of the storage command includes reducing the storage usage value within the definition object of the first quota tree.

5. The method of claim 3,
   wherein the storage command is a command to delete the file;
   wherein updating the storage usage value within the definition object of the second quota tree to reflect the storage usage of the second quota tree upon performance of the storage command includes reducing the storage usage value within the definition object of the second quota tree; and
   wherein updating the storage usage value within the definition object of the first quota tree to reflect the storage usage of the first quota tree upon performance of the storage command includes reducing the storage usage value within the definition object of the first quota tree.

6. The method of claim 3 wherein executing the storage command on the computing device causes the size of the file to be expanded, and wherein the method further comprises, prior to updating the storage usage values and performing the storage command:
   performing a local quota validation operation on the second quota tree, the local quota validation operation validating that performance of the of the storage command would not increase the storage usage value of the second quota tree above the second storage limit; and
   performing a parent quota validation operation on the second first tree, the parent quota validation operation validating that performance of the of the storage command would not increase the storage usage value of the first quota tree above the first storage limit.

7. The method of claim 6 wherein the first quota tree has a parent quota tree to which it is subordinate, and
   performing the parent quota validation operation further includes validating that performance of the of the storage command would not increase a storage usage value of the parent quota tree of the first quota tree above a storage limit of the parent quota tree of the first quota tree.

8. The method of claim 3 wherein the first quota tree has a parent quota tree to which it is subordinate, and
   the method further comprises updating a storage usage value within a definition object of the parent quota tree of the first quota tree to reflect a storage usage of the parent quota tree of the first quota tree upon performance of the storage command.

9. The method of claim 1 wherein the method further comprises:
   receiving a storage command to create a new file within the second directory in the directory hierarchy;
   obtaining the identifier of the second quota tree from an innermost quota tree identifier field of an inode of the second directory;
   accessing the definition object of the second quota tree in the quota tree definition registry by indexing into the quota tree definition registry using the identifier of the second quota tree from the inode of the second directory, the definition object of the second quota tree including a storage usage value reflecting a current storage usage of the second quota tree;
   accessing the definition object of the first quota tree in the quota tree definition registry by indexing into the quota tree definition registry using the identifier of the first quota tree listed as the parent of the second quota tree in the definition object of the second quota tree, the definition object of the first quota tree including a storage usage value reflecting a current storage usage of the first quota tree;
   updating the storage usage value within the definition object of the second quota tree to reflect a storage usage of the second quota tree upon performance of the storage command;

updating the storage usage value within the definition object of the first quota tree to reflect a storage usage of the first quota tree upon performance of the storage command; and performing the storage command with respect to the new file, including inserting the identifier of the second quota tree into an innermost quota tree identifier field of an inode of the new file.

10. The method of claim 1 wherein the method further comprises:
receiving a command to assign a new quota tree to a third directory having the first quota tree above it and the second quota tree below it, the new quota tree defining a new storage limit for storing files within the third directory;
creating a new quota tree identifier to identify the new quota tree;
creating a new quota tree definition object indexed into a quota tree definition registry using the new quota tree identifier;
inserting into the new quota tree definition object:
the new storage limit; and
the identifier of the first quota tree listed as a parent of the third quota tree;
traversing the directory hierarchy down from the third directory, replacing instances of the first quota tree identifier within inodes of child files with the new quota tree identifier and keeping a running total of sizes from those inodes;
adding a storage usage value from a quota tree definition object of the second quota tree indexed by the quota tree identifier of the second quota tree into the quota tree definition registry to the running total, storing the sum as a storage usage value in the new quota tree definition object; and
replacing the first quota tree identifier with the new quota tree identifier within the quota tree definition object of the second quota tree.

11. The method of claim 1,
wherein storing the definition object of the first quota tree in the quota tree definition registry includes placing the definition object of the first quota tree at an address within the sparse file defined by the identifier of the first quota tree, the definition object of the first quota tree not containing the identifier of the first quota tree; and
wherein storing the definition object of the second quota tree in the quota tree definition registry includes placing the definition object of the second quota tree at an address within the sparse file defined by the identifier of the second quota tree, the definition object of the second quota tree not containing the identifier of the second quota tree.

12. The method of claim 11,
wherein the definition objects stored within the quota tree definition registry do not include any file handles;
wherein assigning the first quota tree to the first directory further includes placing a first record in a database separate from the quota tree definition registry, the database serving to map a topology of the quota trees of the filesystem, the first record including:
an index field including the identifier of the first quota tree; and
a file handle of the first directory; and
wherein assigning the second quota tree to the second directory further includes placing a second record in the database, the second record including:
an index field including the identifier of the second quota tree;
a file handle of the second directory; and
the identifier of the first quota tree listed as the parent of the second quota tree.

13. An apparatus comprising:
memory, the memory storing a set of instructions; and
a processor, the processor being configured to execute the instructions stored within memory to perform the following acts:
receiving a first instruction to place a first quota tree within a directory hierarchy of a filesystem;
receiving a second instruction to place a second quota tree within the directory hierarchy of the filesystem;
assigning a first quota tree to a first directory of the filesystem, the first quota tree defining a first storage limit for storing files within the first directory, wherein assigning the first quota tree to the first directory includes placing an identifier of the first quota tree in an inode of each of a set of files of the first directory; and
assigning a second quota tree to a second directory of the filesystem, the second directory being subordinate to the first directory in the directory hierarchy, the second quota tree defining a second storage limit for storing files within the second directory, wherein assigning the second quota tree to the second directory includes placing an identifier of the second quota tree in an inode of each of a set of files of the second directory;
wherein the act of assigning the first quota tree to the first directory includes storing a definition object of the first quota tree in a quota tree definition registry, the definition object of the first quota tree including the first storage limit, wherein the quota tree definition registry is a sparse file without a fixed size; and
wherein the act of assigning the second quota tree to the second directory includes storing a definition object of the second quota tree in the quota tree definition registry, the definition object of the second quota tree including:
the second storage limit; and
the identifier of the first quota tree listed as a parent of the second quota tree.

14. The apparatus of claim 13 wherein the processor is further configured to execute the instructions stored within memory to perform the following acts:
receiving a storage command directed at a file subordinate to the second directory in the directory hierarchy, the file having an inode with an innermost quota tree identifier field storing the identifier of the second quota tree;
accessing the definition object of the second quota tree in the quota tree definition registry by indexing into the quota tree definition registry using the identifier of the second quota tree from the inode of the file, the definition object of the second quota tree including a storage usage value reflecting a current storage usage of the second quota tree;
accessing the definition object of the first quota tree in the quota tree definition registry by indexing into the quota tree definition registry using the identifier of the first quota tree listed as the parent of the second quota tree in the definition object of the second quota tree, the definition object of the first quota tree including a storage usage value reflecting a current storage usage of the first quota tree;

updating the storage usage value within the definition object of the second quota tree to reflect a storage usage of the second quota tree upon performance of the storage command;
updating the storage usage value within the definition object of the first quota tree to reflect a storage usage of the first quota tree upon performance of the storage command; and
performing the storage command with respect to the file.

15. The apparatus of claim 14,
wherein the storage command is a command to delete the file;
wherein the act of updating the storage usage value within the definition object of the second quota tree to reflect the storage usage of the second quota tree upon performance of the storage command includes reducing the storage usage value within the definition object of the second quota tree; and
wherein the act of updating the storage usage value within the definition object of the first quota tree to reflect the storage usage of the first quota tree upon performance of the storage command includes reducing the storage usage value within the definition object of the first quota tree.

16. The apparatus of claim 14 wherein the act of executing the storage command on the computing device causes the size of the file to be expanded, and wherein the processor is further configured to execute the instructions stored within memory to perform the following acts prior to updating the storage usage values and performing the storage command:
performing a local quota validation operation on the second quota tree, the local quota validation operation validating that performance of the of the storage command would not increase the storage usage value of the second quota tree above the second storage limit; and
performing a parent quota validation operation on the second first tree, the parent quota validation operation validating that performance of the of the storage command would not increase the storage usage value of the first quota tree above the first storage limit.

17. The apparatus of claim 16 wherein the first quota tree has a parent quota tree to which it is subordinate, and
the act of performing the parent quota validation operation further includes validating that performance of the of the storage command would not increase a storage usage value of the parent quota tree of the first quota tree above a storage limit of the parent quota tree of the first quota tree.

18. The apparatus of claim 13 wherein the processor is further configured to execute the instructions stored within memory to perform the following acts:
receiving a storage command to create a new file within the second directory in the directory hierarchy;
obtaining the identifier of the second quota tree from an innermost quota tree identifier field of an inode of the second directory;
accessing the definition object of the second quota tree in the quota tree definition registry by indexing into the quota tree definition registry using the identifier of the second quota tree from the inode of the second directory, the definition object of the second quota tree including a storage usage value reflecting a current storage usage of the second quota tree;
accessing the definition object of the first quota tree in the quota tree definition registry by indexing into the quota tree definition registry using the identifier of the first quota tree listed as the parent of the second quota tree in the definition object of the second quota tree, the definition object of the first quota tree including a storage usage value reflecting a current storage usage of the first quota tree;
updating the storage usage value within the definition object of the second quota tree to reflect a storage usage of the second quota tree upon performance of the storage command;
updating the storage usage value within the definition object of the first quota tree to reflect a storage usage of the first quota tree upon performance of the storage command; and
performing the storage command with respect to the new file, including inserting the identifier of the second quota tree into an innermost quota tree identifier field of an inode of the new file.

19. The apparatus of claim 13 wherein the processor is further configured to execute the instructions stored within memory to perform the following acts:
receiving a command to assign a new quota tree to a third directory having the first quota tree above it and the second quota tree below it, the new quota tree defining a new storage limit for storing files within the third directory;
creating a new quota tree identifier to identify the new quota tree;
creating a new quota tree definition object indexed into a quota tree definition registry using the new quota tree identifier;
inserting into the new quota tree definition object:
the new storage limit; and
the identifier of the first quota tree listed as a parent of the third quota tree;
traversing the directory hierarchy down from the third directory, replacing instances of the first quota tree identifier within inodes of child files with the new quota tree identifier and keeping a running total of sizes from those inodes;
adding a storage usage value from a quota tree definition object of the second quota tree indexed by the quota tree identifier of the second quota tree into the quota tree definition registry to the running total, storing the sum as a storage usage value in the new quota tree definition object; and
replacing the first quota tree identifier with the new quota tree identifier within the quota tree definition object of the second quota tree.

20. A computer program product comprising a non-transitory computer-readable storage medium storing a set of instructions, which, when executed by a computing device, cause the computing device to perform the following acts:
receiving a first instruction to place a first quota tree within a directory hierarchy of a filesystem;
receiving a second instruction to place a second quota tree within the directory hierarchy of the filesystem;
assigning a first quota tree to a first directory of the filesystem, the first quota tree defining a first storage limit for storing files within the first directory, wherein assigning the first quota tree to the first directory includes placing an identifier of the first quota tree in an inode of each of a set of files of the first directory; and
assigning a second quota tree to a second directory of the filesystem, the second directory being subordinate to the first directory in the directory hierarchy, the second quota tree defining a second storage limit for storing files within the second directory, wherein assigning the second quota tree to the second directory includes placing an identifier of the second quota tree in an inode of each of a set of files of the second directory;

wherein assigning the first quota tree to the first directory includes storing a definition object of the first quota tree in a quota tree definition registry, the definition object of the first quota tree including the first storage limit, wherein the quota tree definition registry is a sparse file without a fixed size; and wherein assigning the second quota tree to the second directory includes storing a definition object of the second quota tree in the quota tree definition registry, the definition object of the second quota tree including:

the second storage limit; and the identifier of the first quota tree listed as a parent of the second quota tree.

\* \* \* \* \*